United States Patent
Beal (12)

(10) Patent No.: US 12,079,183 B2
(45) Date of Patent: Sep. 3, 2024

(54) SYSTEMS AND METHODS FOR A STATELESS BLOCKCHAIN OVERLAY LAYER

(71) Applicant: Coinbase, Inc., Oakland, CA (US)

(72) Inventor: Frederic Beal, Oakland, CA (US)

(73) Assignee: Coinbase, Inc., Oakland, CA (US)

( * ) Notice: Subject to any disclaimer, the term of this patent is extended or adjusted under 35 U.S.C. 154(b) by 126 days.

(21) Appl. No.: 17/810,572

(22) Filed: Jul. 1, 2022

(65) Prior Publication Data

US 2024/0004850 A1   Jan. 4, 2024

(51) Int. Cl.
*G06F 16/21* (2019.01)
*G06F 16/27* (2019.01)
*H04L 9/00* (2022.01)

(52) U.S. Cl.
CPC ............ *G06F 16/219* (2019.01); *G06F 16/27* (2019.01); *G06F 16/273* (2019.01); *G06F 16/275* (2019.01); *G06F 16/278* (2019.01); *H04L 9/50* (2022.05)

(58) Field of Classification Search
CPC ...... G06F 16/219; G06F 16/27; G06F 16/273; G06F 16/275; G06F 16/278; H04L 9/50
See application file for complete search history.

(56) References Cited

U.S. PATENT DOCUMENTS

| | | | | |
|---|---|---|---|---|
| 2019/0342095 A1* | 11/2019 | Simons | .................... | H04L 69/26 |
| 2020/0104296 A1* | 4/2020 | Hunn | .................. | G06F 16/2379 |
| 2020/0285635 A1* | 9/2020 | Roets | ...................... | G06F 21/64 |
| 2021/0091994 A1* | 3/2021 | Meirosu | .................. | H04W 4/24 |

\* cited by examiner

*Primary Examiner* — Kris E Mackes
*Assistant Examiner* — Lin Lin M Htay
(74) *Attorney, Agent, or Firm* — Foley & Lardner LLP

(57) ABSTRACT

Methods and systems allow for the deployment of private (i.e., not necessarily publicly available) and reversible (or replaceable) smart contracts to create the stateless blockchain overlay layer. For example, the stateless blockchain overlay layer allows developers to deploy private smart contracts as overlays on top of any existing blockchain. The deployment of these private smart contracts is instantaneous, reversible, and free. Furthermore, the private smart contracts may be called at any block, including past ones. The private smart contracts may be used to expose arbitrary blockchain-based computation at arbitrary block heights to their developers.

20 Claims, 9 Drawing Sheets

```
contract CeFiLedgerBalance {
// PRAGMA External
mapping(address => mapping(address => uint256)) private balances;

function getUserBalance(address user, address token)
    public view returns uint256 {
    ...
}
```

```
[...]
// PRAGMA External
event CefiTransfer(
    address _from, address _to, address _erc20, uint256 _value);
```

```
contract USDCReceiveObserver {
    // PRAGMA ObserveEvent: Transfer
    // Address: 0x8ac76a51cc950d9822d68b83fe1ad97b32cd580d
    function onUSDCTransfer(address from, address to, uint256 value) {
        ...
    }
}
```

```
// PRAGMA ExportService
contract UniswapBalanceCalculator {
    // PRAGMA export
    function getUserTokenBalance(address _user, address _token)
    public view returns uint256;
}
```

SYSTEMS AND METHODS FOR A STATELESS BLOCKCHAIN OVERLAY LAYER

BACKGROUND

In recent years, the use of blockchains and blockchain technology has exponentially increased. Blockchains comprise a list of records, called "blocks," that are "chained" together using cryptography. Each block may comprise data that is computed using a one-way function (e.g., a function that is practically impossible to invert or reverse-compute) of a previous block, a time stamp (e.g., indicating a creation and/or modification time), and additional data (e.g., transactional or operational data related to blockchain operations).

While publicity for blockchains and blockchain technology has been concentrated on its use for cryptocurrencies, blockchains and blockchain technology may be applicable to numerous technological avenues. A common theme of the technological avenues is the manner in which blockchains and blockchain technology are decentralized such that facilitation, management, and/or verification of blockchain-based operations is governed or administered not by any one authority but instead by a community of users. The blockchain may therefore remain distributed (e.g., on a network of computers that communicate and coordinate their actions by passing messages to one another), and in many cases public, through a digital ledger, which records the series of blocks forming the chain. Notably, because each block depends on a preceding block, edits to existing blocks in the chain may not be made without affecting subsequent blocks.

Furthermore, updates to the blockchain (e.g., the addition of new blocks) may include incentivization systems that reward community members for the generation of the updates while also ensuring a consensus by the community. By doing so, the proliferation of the blockchain may proceed indefinitely.

SUMMARY

Modern blockchains come with their own computational model (e.g., smart contracts). However, processing blockchain data is conventionally done using non-blockchain technology such as software buses that stream updates from the blockchain and cross-platform document-oriented database programs that retrieve and annotate the blockchain data. Accordingly, while blockchain operations rely on their own native computational model, the processing systems used to perform operations with respect to the blockchain data do not use the native computational model.

This creates many technical challenges as conventional database programs are, by their nature, a poor data model fit for smart contracts. For example, smart contracts are executed on demand and are tied to the state of a given blockchain. In contrast, conventional database programs are not natively tied to any blockchain (or a state of a given blockchain) and thus require workarounds such as constant backfilling of database data (e.g., adding missing past data to make a chart complete with no voids and to keep all formulas working), processing of database reorgs (e.g., moving rows within the existing table to re-establish clustering, reclaim free space, and eliminate overflow rows), and performing eager computations (e.g., operations required to be executed immediately as they are called). Each of these workarounds adds unnecessary computations, complexity, and failure points for a system based on blockchain data as well as requiring additional resources, processing power, and technical knowledge.

Accordingly, methods and systems as described herein avoid the aforementioned workarounds. Additionally, the methods and systems avoid the development, deployment, and privacy issues related to a layer 2 solution (e.g., a secondary framework or protocol that is built on top of an existing blockchain system to improve transaction speed and reduce scaling difficulties), while still conforming to a native blockchain computational model. To achieve these benefits, the methods and systems allow for the deployment of private (i.e., not necessarily publicly available) and reversible (or replaceable) smart contracts to create the stateless blockchain overlay layer. This presents a fundamental sea-change in the use of smart contracts as conventional uses of smart contracts and cryptocurrencies rely on the irresistibility of the smart contract to maintain the blockchain's conventional functionality. Nonetheless, by doing so, the system may achieve non-conventional functionality.

For example, the stateless blockchain overlay layer allows developers to deploy private smart contracts as overlays on top of any existing blockchain. The deployment of these private smart contracts is instantaneous, reversible, and free. Furthermore, the private smart contracts may be called at any block, including past ones. The private smart contracts may be used to expose arbitrary blockchain-based computation at arbitrary block heights to their developers. Furthermore, the private, smart contracts of the stateless blockchain overlay layer may access data from any blockchain, allowing aggregations across blockchains in a seamless, single unified programming model.

To achieve this non-conventional functionality, the stateless blockchain overlay layer maintains separate nodes with internal overlays that are synched with blockchain mainnets (e.g., an independent blockchain running its own network with its own technology and protocol). The processing layer also comprises an internal source code repository such that it may receive deployments of separate smart contracts, each with its own state, and maintain these smart contracts internally while simultaneously allowing the smart contracts to be integrated with the internal source code repository. However, as opposed to a layer 2 solution, which is "off-chain" (i.e., a separate blockchain in which the processing of blockchain transactions and processes can take place independently of the main chain of the blockchain), the blockchain overlay layer is not a chain and is stateless.

Moreover, the stateless blockchain overlay layer does not require the use of an indexer; thus, overall speed at which blockchain data may be processed is increased. For example, in a conventional system, if the system were to process blockchain data for use in a database or other conventional program, the system would first need to generate an index of the blockchain data (e.g., using a blockchain indexer). The conventional system would then process the indexed blockchain data, which due to the indexer has been converted into a format that is not native to the blockchain, using the conventional program. This extra step not only increases the computations and resources needed to run the conventional program, but also prevents the conventional program from operating in real time (e.g., due to the need to first convert the blockchain data). In contrast, because the stateless blockchain overlay layer is not indexing, the system can run a new program or algorithm directly on the stateless blockchain overlay layer (i.e., directly on the smart contracts that are tied to the layer).

Additionally, as the stateless blockchain overlay layer supports specialized, private smart contracts, the data pulled and the functionality performed may be done with increased security and privacy. Additionally, the stateless blockchain overlay layer supports private smart contracts that allow external, stateful data to be published to the processing layer with a time stamp for the data. Thus, while the blockchain overlay layer is stateless, the data that it processes and stores (e.g., via links to one or more data stores) may be stateful.

In some aspects, a system for aggregating and accessing data across blockchain networks using a seamless, single unified programming model in order to perform blockchain operations is described. For example, the system may receive, at a stateless blockchain overlay layer, a first request for a first blockchain operation, wherein the first request corresponds to a protocol that is native to a first blockchain network, wherein the stateless blockchain overlay layer comprises a plurality of replaceable smart contracts, and wherein the stateless blockchain overlay layer is in communication with a plurality of blockchain nodes for the first blockchain network. The system may, in response to the first request, generate, at the stateless blockchain overlay layer, a second request to an internal data repository for the stateless blockchain overlay layer, wherein the second request corresponds to the protocol that is native to the first blockchain network, and wherein the second request is for data accessible to the internal data repository for the performing the first blockchain operation. The system may, in response to the second request, perform, by the stateless blockchain layer, the first blockchain operation. The system may, in response to performing the first blockchain operation, generate for display, on a user interface, information confirming that the first blockchain operation was performed.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

BRIEF DESCRIPTION OF THE DRAWINGS

FIG. 6 shows illustrative pseudocode for a blockchain overlay layer that allows an interpreter to determine where data is stored, in accordance with one or more embodiments.

FIG. 7 shows illustrative pseudocode for publishing data using a blockchain overlay layer, in accordance with one or more embodiments.

FIG. 8 shows illustrative pseudocode for pseudocode a blockchain overlay layer that triggers a specific observer to be called on every transfer event, in accordance with one or more embodiments.

FIG. 9 shows illustrative pseudocode for a blockchain overlay layer that allows smart contracts to automatically generate remote procedure call endpoints, in accordance with one or more embodiments.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
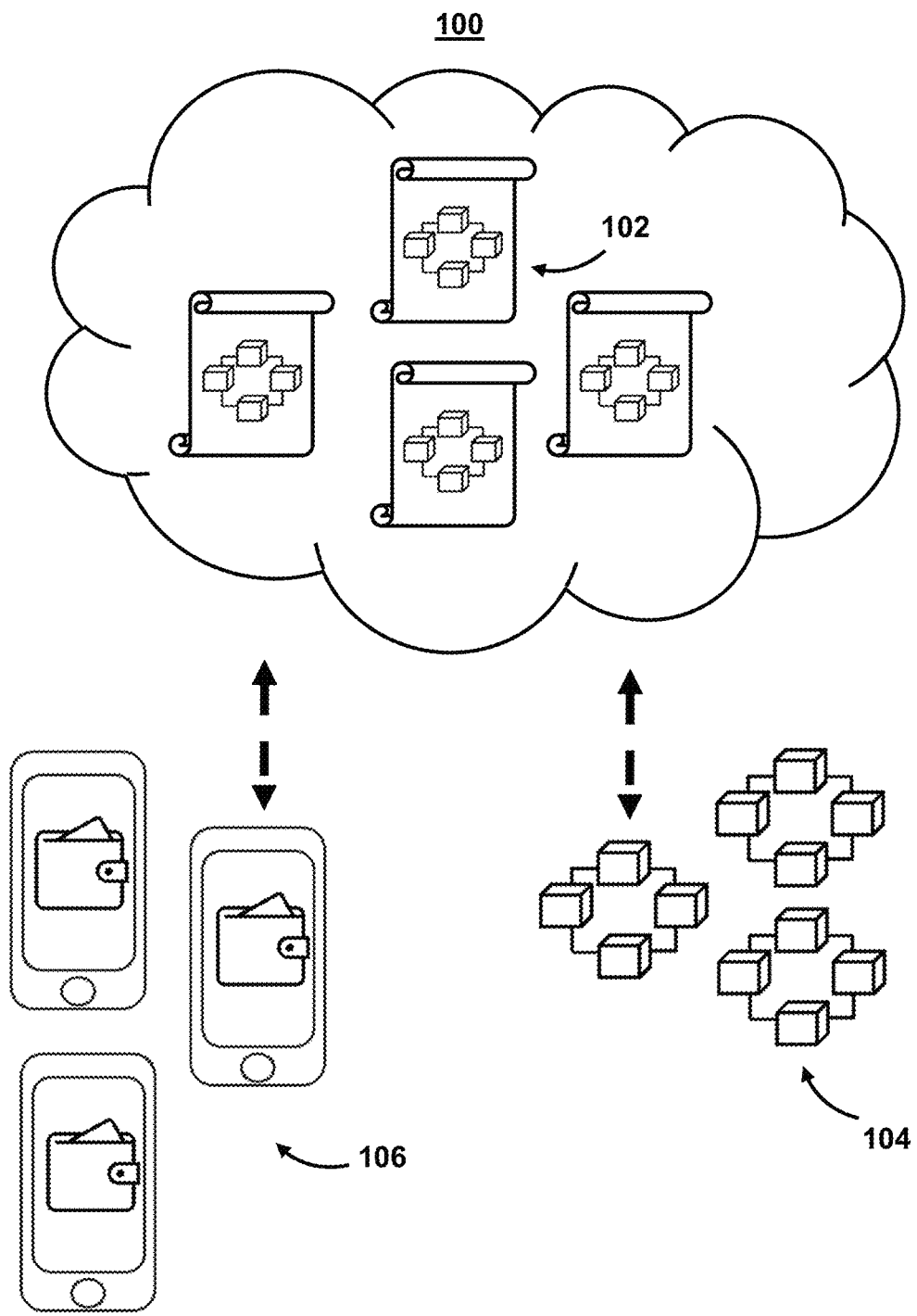
FIG. 1 shows an illustrative diagram of an architecture for a stateless blockchain overlay layer, in accordance with one or more embodiments.

FIG. 1 shows an illustrative diagram of an architecture for a stateless blockchain overlay layer, in accordance with one or more embodiments. For example, the system may create blockchain overlay layer 100 as shown in FIG. 1. Blockchain overlay layer 100 may comprise a plurality of replaceable smart contracts 102. Each of the plurality of replaceable smart contracts 102 may comprise functionality (e.g., as described below) that allows the individual smart contract to be replaceable. This plurality of replaceable smart contracts may then be integrated with each other into a software layer. That is, the system may create a stateless blockchain overlay layer comprising a plurality of replaceable smart contracts.

Blockchain overlay layer 100 also may be integrated with a plurality of blockchain nodes 104 for one or more blockchain networks. For example, in some embodiments, the blockchain overlay layer 100 may perform blockchain operations across different blockchain networks. Blockchain overlay layer 100 may also receive one or more requests from one or more devices (e.g., user devices 106).

For example, blockchain overlay layer 100 may receive a first request for a first blockchain operation. Furthermore, the first request may correspond to a protocol that is native to a first blockchain network. For example, blockchain overlay layer 100 does not require the use of an indexer; thus, the system (e.g., blockchain overlay layer 100) may run a request (e.g., a new program, call, and/or algorithm) directly on blockchain overlay layer 100 (i.e., directly on the plurality of replaceable smart contracts 102). Blockchain overlay layer 100 may also generate for display (e.g., on a user interface of one or more of user devices 106) information related to blockchain overlay layer 100, the plurality of replaceable smart contracts 102, and/or a blockchain operation.

In some embodiments, the smart contracts may be private smart contracts. Private smart contracts may comprise fully or partially private smart contracts. For example, a private smart contract may be a smart contract that is not public or includes information that is not public. The smart contract may also include some information that is public and some information that is private. The smart contract may further determine what information is public and what information is private based on one or more access rules and/or user credentials.

In some embodiments, the smart contract may be reversible. A reversible smart contract may be a smart contract that is replaceable in the smart contract ecosystem. This may include replacing the smart contract on a blockchain, creating a fork in an existing blockchain to accommodate the smart contract, activating/de-activating a smart contract, and/or updating a smart contract on a blockchain. Due to the immutable nature of blockchain technology, these operations are not as simple as updating other types of software of the same complexity.

This immutability raises several technical challenges. For example, all users that may use an existing smart contract need to now reference the address of the new smart contract. Additionally or alternatively, the original smart contract should be disabled to prevent forks and disputes among the contracts (and force all users to use the new contract). Additionally or alternatively, any data tied to a previous smart contract (e.g., points, state information, etc.) needs to be moved and/or incorporated into the new smart contract.

In view of these challenges, the system may employ smart contracts that include version information. Each version of the smart contract may include information that directs users to a correct smart contract (e.g., a current smart contract). For example, when a smart contract is deployed to the blockchain, every instance of the smart contract is assigned to a unique address. This address is used to reference the smart contract's instance in order to invoke its methods and read/write data from/to the contract's storage (state). When the system deploys an updated version of the contract to the blockchain, the new instance of the contract will be deployed at a new address. This new address is different from the first contract's address. As such, the system updates users that interact with the smart content so that they use the address of the updated version.

In some embodiments, the system may achieve this through the use of a substitute identifier for the address (e.g., such as using a reference indicating a blockchain naming service instead of a unique contract address). If the system uses the substitute identifier, the system may update the smart contract that is linked to the naming service, thus bypassing the difficulties due to the immutability of blockchain technology. In such cases, all users and other smart contracts reference the substitute identifier instead of the unique contract address. The system may freely update the underlying smart contract that is used as long as the substitute identifier is used to indicate the current smart contract for the stateless blockchain overlay layer.

Additionally or alternatively, the system may use pausable smart contracts or emergency stops. In such cases, the original smart contract is disabled. For example, the smart contract may include a logic function (e.g., using a simple Boolean variable) that may allow a smart contract to be toggled between paused and unpaused. The system may then have a function (e.g., that may only be called by an owner of a smart contract (e.g., stateless blockchain overlay layer)) to update the paused variable. When this function is performed, the smart contract is paused and will not execute. In some embodiments, other logic functions may be used. For example, the logic function may cause the performance of a check for the latest version of the smart contract and/or may automatically direct a user to the latest version (which may be the current version). In another example, the logic function may disable and/or automatically invoke/enable another smart contract (e.g., a current version) or another smart contract's functionalities after a certain state is reached (e.g., a time period, transaction limit, etc.).

Additionally or alternatively, a smart contract may include a modifier that will revert (or redirect) a blockchain operation if a smart contract is paused or disabled. The modifier may also automatically invoke/enable another smart contract (e.g., a current version) or another smart contract's functionalities. The system may also use an internal data repository to provide rules and protocols for reversing (e.g., replacing) smart contracts. The internal data repository may be particularly useful in scenarios where smart contracts include large amounts of data that may require migration.

For example, in contracts with a more complex state, the work required to perform an upgrade is significant and may incur considerable gas costs to copy data over the blockchain. Using libraries and proxies may be used to provide smart contracts that are easier to upgrade. For example, the data may be kept in a contract that stores the state but bears no logic (state contract). The second contract or library implements the logic, without affecting the state (logic contract). Therefore, any reversal (replacement) only requires a change to the logic contract, without migrating the state stored in the state contract.

Figure 2:
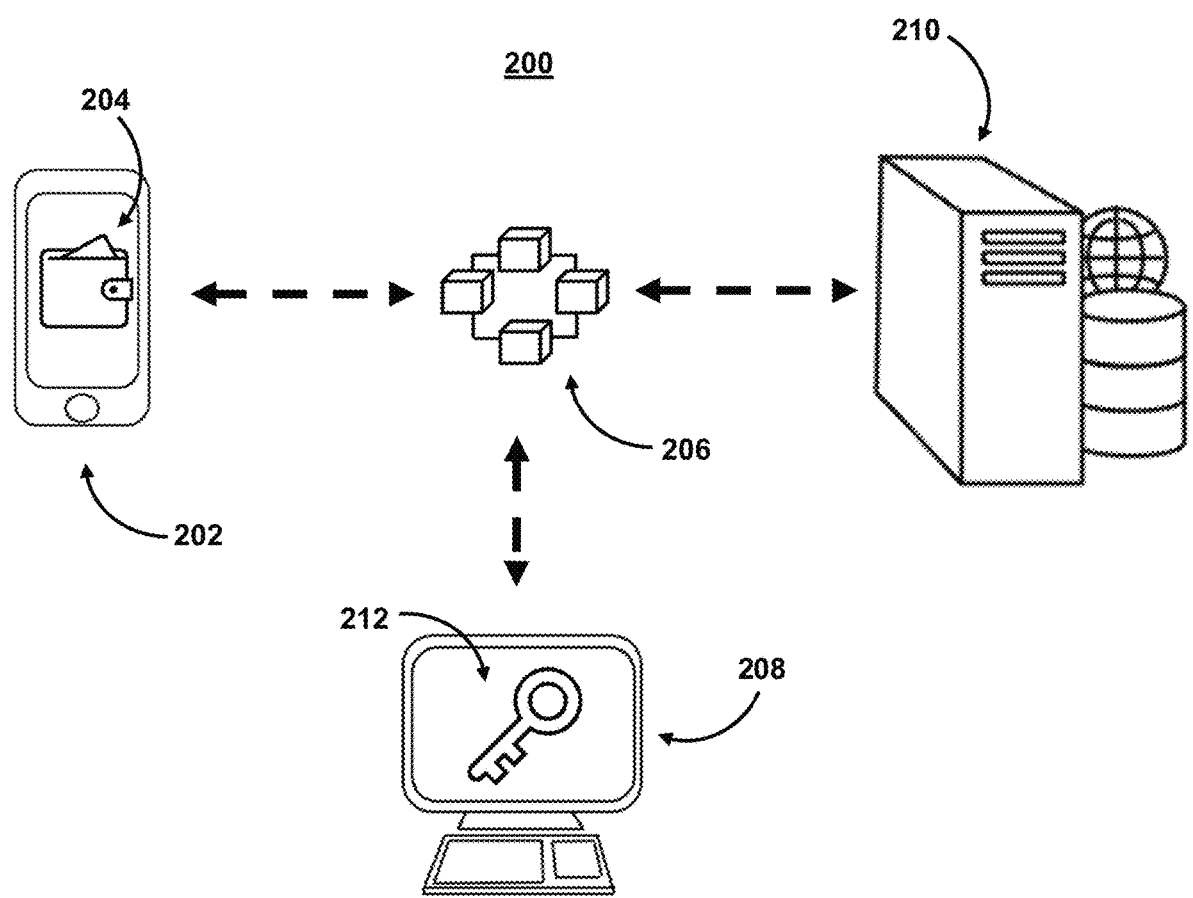
FIG. 2 shows an illustrative diagram for conducting blockchain operations, in accordance with one or more embodiments.

FIG. 2 shows an illustrative diagram for conducting blockchain operations, in accordance with one or more embodiments. For example, the diagram presents various components that may be used to facilitate a blockchain overlay layer in some embodiments. FIG. 2 includes user device 202. User device 202 may include a user interface. As referred to herein, a "user interface" may comprise a mechanism for human-computer interaction and communication in a device and may include display screens, keyboards, a mouse, and the appearance of a desktop. For example, a user interface may comprise a way a user interacts with an application or website in order to facilitate a blockchain overlay layer, and the user interface may display content related to a blockchain overlay layer. As referred to herein, "content" should be understood to mean an electronically consumable user asset, representations of goods or services (including nonfungible tokens), internet content (e.g., streaming content, downloadable content, webcasts, etc.), video data, audio data, image data, and/or textual data, etc.

As shown in FIG. 2, system 200 may include multiple user devices (e.g., user device 202, user device 208, and/or user device 210). For example, system 200 may comprise a distributed state machine, in which each of the components in FIG. 2 acts as a client of system 200. For example, system 200 (as well as other systems described herein) may comprise a large data structure that holds not only all accounts and balances but also a state machine, which can change from block to block according to a predefined set of rules and which can execute arbitrary machine code. The specific rules of changing state from block to block may be maintained by a virtual machine (e.g., a computer file implemented on and/or accessible by a user device, which behaves like an actual computer) for the system.

It should be noted that, while shown as a smartphone, a personal computer, and a server in FIG. 2, the user devices may be any type of computing devices, including, but not limited to, a laptop computer, a tablet computer, a handheld computer, and/or other computing equipment (e.g., a server), including "smart," wireless, wearable, and/or mobile devices. It should be noted that embodiments describing system 200 performing a blockchain operation may equally be applied to, and correspond to, an individual user device (e.g., user device 202, user device 208, and/or user device 210) performing the blockchain operation. That is, system 200 may correspond to the user devices (e.g., user device 202, user device 208, and/or user device 210) collectively or individually.

Each of the user devices may be used by the system to conduct blockchain operations and/or contribute to a blockchain overlay layer. As referred to herein, "blockchain operations" may comprise any operations including and/or related to blockchains and blockchain technology. For example, blockchain operations may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain operation may comprise the creation, modification, detection, and/or execution of a smart contract or program stored on a blockchain. For example, a smart contract may comprise a program stored on a blockchain that is executed (e.g., automatically, without any intermediary's involvement or time loss) when one or more predetermined conditions are met. In some embodiments, a blockchain operation may comprise the creation, modification, exchange, and/or review of a token (e.g., a digital asset-specific blockchain), including a non-fungible token. A nonfungible token may comprise a token that is associated with a good, a service, a smart contract, and/or other content that may be verified by, and stored using, blockchain technology.

In some embodiments, blockchain operations may also comprise actions related to mechanisms that facilitate other blockchain operations (e.g., actions related to metering activities for blockchain operations on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain operation (e.g., computation, data access, transaction, etc.). Each blockchain operation has a predetermined cost in units of gas (e.g., as determined based on a predefined set of rules for the system). When a blockchain operation triggers the execution of a smart contract, the blockchain operation may include an amount of gas that sets the upper limit of what can be consumed in running the smart contract. The system may terminate execution of the smart contract if the amount of gas consumed by computation exceeds the gas available in the blockchain operation. For example, in Ethereum, gas comprises a mechanism for allowing Turing-complete computation while limiting the resources that any smart contract and/or blockchain operation may consume.

In some embodiments, gas may be obtained as part of a blockchain operation (e.g., a purchase) using a network-specific cryptocurrency (e.g., ether in the case of Ethereum). The system may require gas (or the amount of the network-specific cryptocurrency corresponding to the required amount of gas) to be transmitted with the blockchain operation as an earmark to the blockchain operation. In some embodiments, gas that is earmarked for a blockchain operation may be refunded back to the originator of the blockchain operation if, after the computation is executed, an amount remains unused.

Additionally, a blockchain operation may comprise any operation related to a smart contract. For example, a smart contract may be a program stored on a blockchain that runs when predetermined conditions are met. Typically, smart contracts are used to automate the execution of an agreement so that all participants can be immediately certain of the outcome, without any intermediary's involvement or time loss. Smart contracts can also automate a workflow, triggering the next action when conditions are met. As described herein, smart contracts may also be used to generate a stateless blockchain overlay layer.

For example, the stateless blockchain overlay layer may allow developers to deploy smart contracts as overlays on top of any existing blockchain. The deployment of these smart contracts is instantaneous, reversible, and free. Furthermore, the smart contracts may be called at any block, including past ones. The smart contracts may be used to expose arbitrary blockchain-based computation at arbitrary block heights to their developers. Furthermore, the smart contracts of the stateless blockchain overlay layer may access data from any blockchain, allowing aggregations across blockchains in a seamless, single unified programming model.

As shown in FIG. 2, one or more user devices may include a digital wallet (e.g., digital wallet 204) used to perform blockchain operations. For example, the digital wallet may comprise a repository that allows users to store, manage, and trade their cryptocurrencies and assets, interact with blockchains, and/or conduct blockchain operations using one or more applications. That is, the digital wallet may comprise a cryptography-based storage application, wherein the cryptography-based storage application corresponds to a private key, and wherein the private key is stored on a user device. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain operations, while a cold wallet is generally used for managing a user account and may have no connection to the internet.

As shown in FIG. 2, one or more user devices may include a private key (e.g., key 212) and/or a digital signature. For example, system 200 may use cryptographic systems for conducting blockchain operations such as those related to a smart contract. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain operation) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain operations. As an illustration, when conducting blockchain operations, system 200 may use the digital signature to prove to every node in the system that it is authorized to conduct the blockchain operations.

For example, system 200 may comprise a plurality of nodes for the blockchain network. Each node may correspond to a user device (e.g., user device 208). A node for a blockchain network may comprise an application or other software that records and/or monitors peer connections to other nodes and/or miners for the blockchain network. For example, a miner comprises a node in a blockchain network that facilitates blockchain operations by verifying blockchain operations on the blockchain, adding new blocks to the existing chain, and/or ensuring that these additions are accurate. The nodes may continually record the state of the blockchain and respond to remote procedure requests for information about the blockchain. For example, a node may verify batches of blockchain operations, and wherein each batch of the batches comprises a plurality of blockchain operations involving one or more cryptography-based storage applications.

For example, user device 208 may request a blockchain operation (e.g., conduct a transaction). The blockchain operation may be authenticated by user device 208 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain operation (e.g., using key 212), the blockchain operation may be authorized. For example, after the blockchain operation is authenticated between the users, system 200 may authorize the blockchain operation prior to adding it to the blockchain. System 200 may add the blockchain operation to blockchain 206. System 200 may perform this based on a consensus of the user devices within system 200. For example, system 200 may rely on a majority (or other metric) of the nodes in the community network (e.g., user device 202, user device 208, and/or user device 210) to determine that the blockchain operation is valid. In response to validation of the block, a node user device (e.g., user device 202, user device 208, and/or user device 210) in the community network (e.g., a miner) may receive a reward (e.g., in a given cryptocurrency) as an incentive for validating the block.

To validate the blockchain operation, system 200 may use one or more validation protocols and/or validation mechanisms. For example, system 200 may use a proof-of-work mechanism in which a user device must provide evidence that it performed computational work to validate a blockchain operation, thus providing a method for achieving consensus in a decentralized manner as well as preventing fraudulent validations. For example, the proof-of-work mechanism may involve iterations of a hashing algorithm. The user device that is successful aggregates and records blockchain operations from a mempool (e.g., a collection of all valid blockchain operations waiting to be confirmed by the blockchain network) into the next block. Alternatively or additionally, system 200 may use a proof-of-stake mechanism in which a user account (e.g., corresponding to a node on the blockchain network) is required to have, or "stake," a predetermined number of tokens in order for system 200 to recognize it as a validator in the blockchain network.

In response to validation of the block, the block is added to blockchain 206, and the blockchain operation is completed. For example, to add the blockchain operation to blockchain 206, the successful node (e.g., the successful miner) encapsulates the blockchain operation in a new block before transmitting the block throughout system 200.

Figure 3:
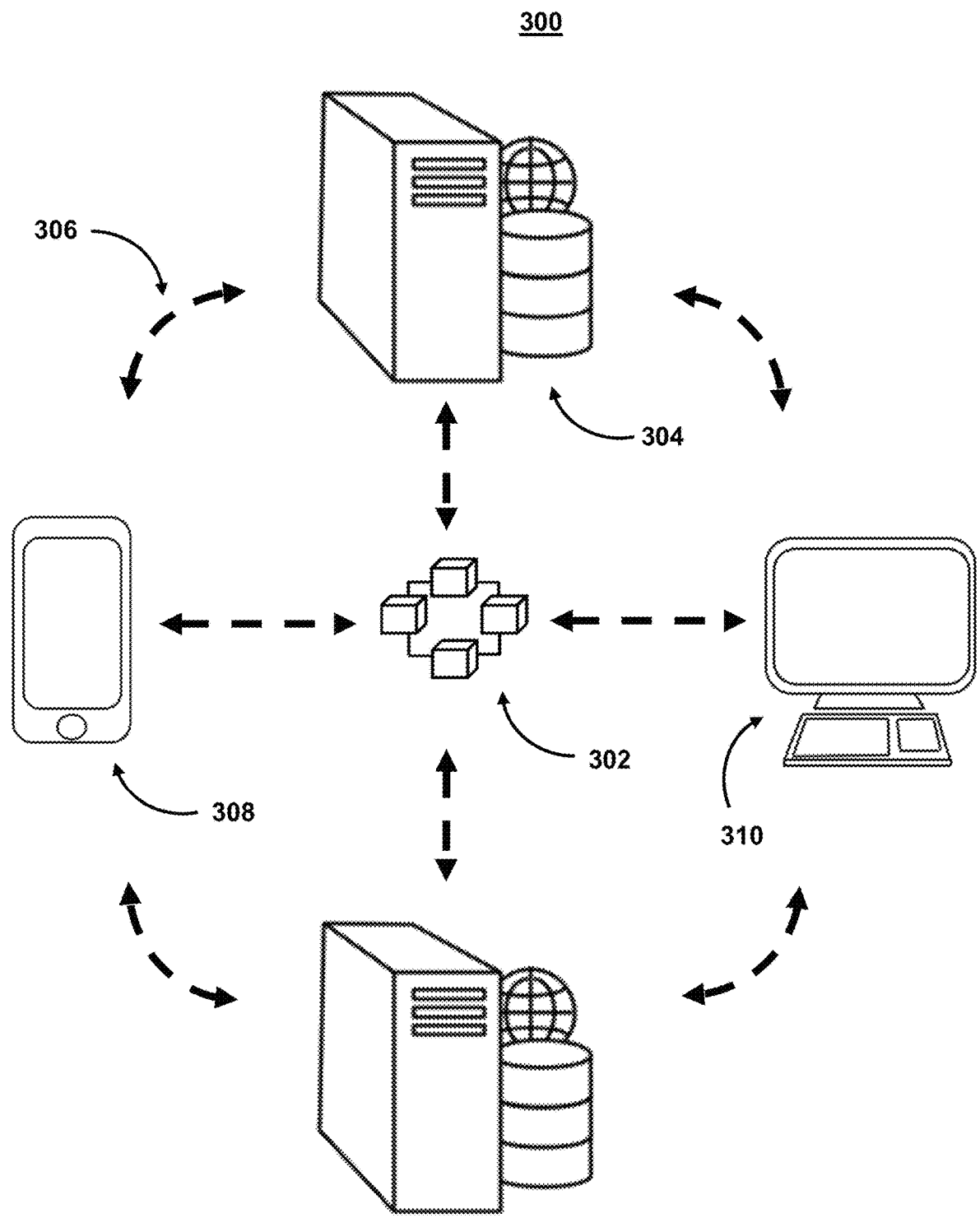
FIG. 3 shows an illustrative diagram for a decentralized application, in accordance with one or more embodiments.

FIG. 3 shows an illustrative diagram for a decentralized application, in accordance with one or more embodiments. For example, in some embodiments, system 300 may facilitate a blockchain overlay layer within a decentralized application environment. A decentralized application may comprise an application that exists on a blockchain (e.g., blockchain 302) and/or a peer-to-peer network (e.g., network 306). That is, a decentralized application may comprise an application that has a back end that is in part powered by a decentralized peer-to-peer network such as a decentralized, open-source blockchain with smart contract functionality.

For example, network 306 may allow user devices (e.g., user device 304) within network 306 to share files and access. In particular, the peer-to-peer architecture of network 306 allows blockchain operations (e.g., corresponding to blockchain 302) to be conducted between the user devices in the network, without the need of any intermediaries or central authorities.

In some embodiments, the user devices of system 300 may comprise one or more cloud components. For example, cloud components may be implemented as a cloud computing system and may feature one or more component devices. It should also be noted that system 300 is not limited to four devices. Users may, for instance, utilize one or more devices to interact with one another, one or more servers, or other components of system 300. It should be further noted that while one or more operations (e.g., blockchain operations) are described herein as being performed by a particular component (e.g., user device 304) of system 300, those operations may, in some embodiments, be performed by other components of system 300. As an example, while one or more operations are described herein as being performed by components of user device 304, those operations may, in some embodiments, be performed by one or more cloud components. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components (e.g., user device 304 and user device 308, respectively). Additionally, or alternatively, a single user (and/or a user account linked to a single user) may interact with system 300 and/or one or more components of system 300 using two different components (e.g., user device 304 and user device 308, respectively).

With respect to the components of system 300, each of these devices may receive content and data via input/output (hereinafter "I/O") paths using I/O circuitry. Each of these devices may also include processors and/or control circuitry to send and receive commands, requests, and other suitable data using the I/O paths. The control circuitry may comprise any suitable processing, storage, and/or I/O circuitry. Each of these devices may also include a user input interface and/or user output interface (e.g., a display) for use in receiving and displaying data. For example, as shown in FIG. 3, both user device 308 and user device 310 include a display upon which to display data (e.g., content related to one or more blockchain operations).

Additionally, the devices in system 300 may run an application (or another suitable program). The application may cause the processors and/or control circuitry to perform operations related to a blockchain overlay layer within a decentralized application environment.

Each of these devices may also include electronic storages. The electronic storages may include non-transitory storage media that electronically stores information. The electronic storage media of the electronic storages may include one or both of (i) system storage that is provided integrally (e.g., is substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more optically readable storage media (e.g., optical disk, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes network 306, which may comprise communication paths between user devices. The communication paths may include the internet, a mobile phone network, a mobile voice or data network (e.g., a 5G or LTE network), a cable network, a public switched telephone network, or other types of communication networks or combinations of communication networks. The communication paths may separately or together include one or more communication paths, such as a satellite path, a fiber-optic path, a cable path, a path that supports internet communications (e.g., IPTV), free-space connections (e.g., for broadcast or other wireless signals), or any other suitable wired or wireless communication path or combination of such paths. The computing devices may include additional communication paths linking a plurality of hardware, software, and/or firmware components operating together. For example, the computing devices may be implemented by a cloud of computing platforms operating together as the computing devices.

Figure 4:
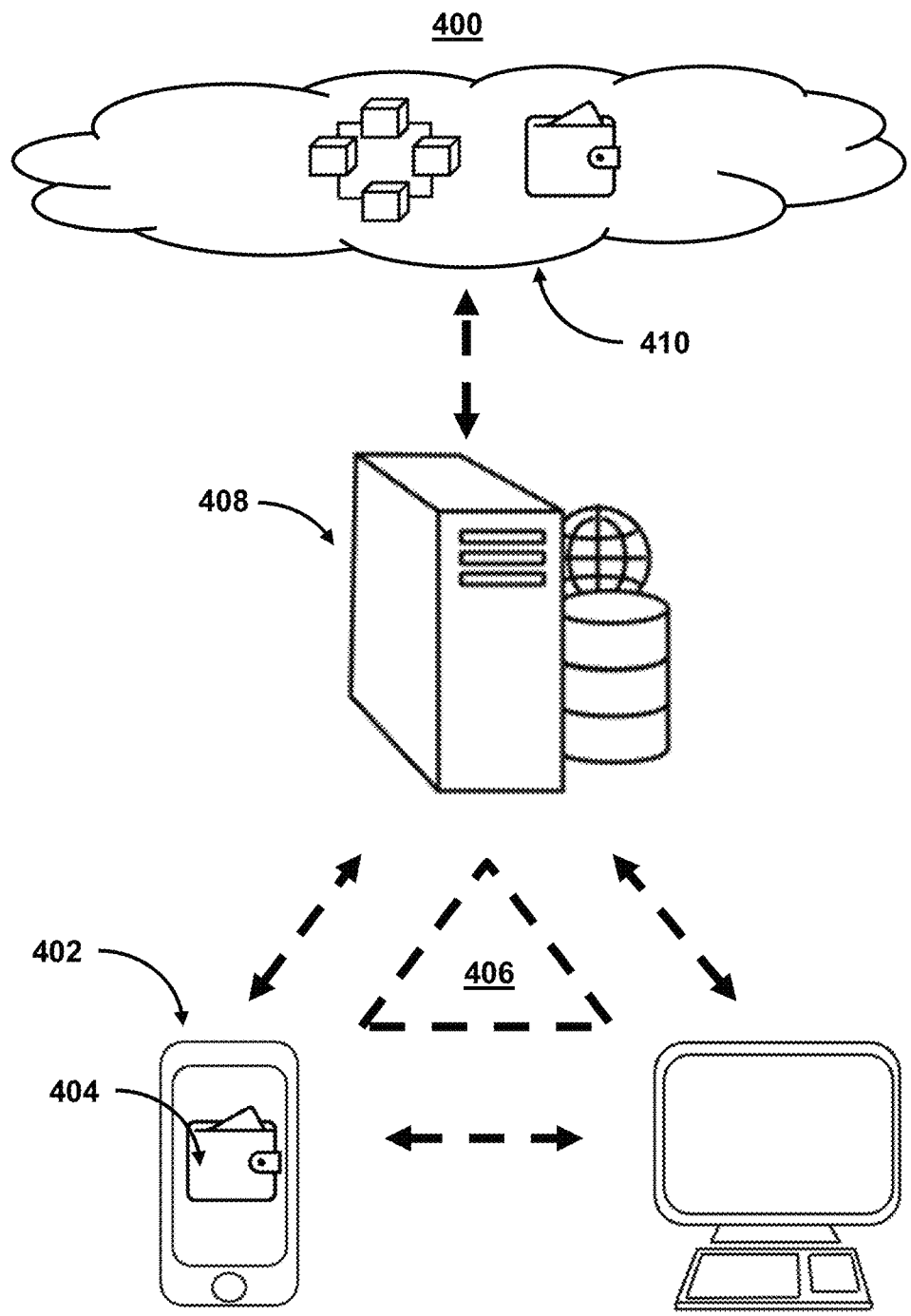
FIG. 4 shows an illustrative diagram for conducting operations in a decentralized application using blockchain operations, in accordance with one or more embodiments.

FIG. 4 shows an illustrative diagram for conducting operations in a decentralized application using blockchain operations, in accordance with one or more embodiments. For example, system 400 may include user device 402. Furthermore, user device 402 may comprise an application (e.g., application 404) that is implemented on, and/or accessible by, user device 402. For example, application 404 may interact with one or more other applications and/or application programming interfaces (APIs) in order to facilitate a blockchain overlay layer. For example, application 404 may comprise a decentralized application digital wallet and/or wallet service that is able to sign and send transactions to transfer tokens and/or perform other blockchain operations as well as interact with one or more decentralized applications.

System 400 also includes API layer 406. In some embodiments, API layer 406 may be implemented on user device 402. Alternatively or additionally, API layer 406 may reside on one or more cloud components (e.g., server 408). For example, API layer 406 may reside on a server 408 and comprise a platform service for a custodial wallet service, decentralized application, etc. API layer 406 (which may be a REST or web services API layer) may provide a decoupled interface to data and/or functionality of one or more applications.

API layer 406 may provide various low-level and/or blockchain-specific operations in order to facilitate a blockchain overlay layer. For example, API layer 406 may provide blockchain operations such as blockchain writes. Furthermore, API layer 406 may perform a transfer validation ahead of forwarding the blockchain operation (e.g., a transaction) to another service (e.g., a crypto service). API layer 406 may then log the outcome. For example, by logging to the blockchain prior to forwarding, API layer 406 may maintain internal records and balances without relying on external verification (e.g., which may take up to ten minutes based on blockchain updating activity).

API layer 406 may also provide informational reads. For example, API layer 406 (or a platform service powered by API layer 406) may generate blockchain operation logs and write to an additional ledger (e.g., an internal record and/or indexer service) the outcome of the reads. If this is done, a user accessing the information through other means may see consistent information such that downstream users ingest the same data point as the user.

API layer 406 may also provide a unified API to access balances, transaction histories, and/or other blockchain operations activity records between one or more decentralized applications and custodial user accounts. By doing so, the system maintains the security of sensitive information such as the balances and transaction history. Alternatively, a mechanism for maintaining such security would separate the API access between the decentralized applications and the custodial user accounts through the use of special logic. The introduction of the special logic decreases the streamlining of the system, which may result in system errors based on divergence and reconciliation.

API layer 406 may provide a common, language-agnostic way of interacting with an application. In some embodiments, API layer 406 may comprise a web services API that offers a well-defined contract that describes the services in terms of their operations and the data types used to exchange information. REST APIs do not typically have this contract; instead, they are documented with client libraries for most common languages including Ruby, Java, PHP, and JavaScript. SOAP web services have traditionally been adopted in the enterprise for publishing internal services as well as for exchanging information with partners in business-to-business (B2B) transactions.

API layer 406 may use various architectural arrangements. For example, system 400 may be partially based on API layer 406, such that there is strong adoption of SOAP and RESTful web services, using resources such as Service Repository and Developer Portal, but with low governance, standardization, and separation of concerns. Alternatively, system 400 may be fully based on API layer 406, such that separation of concerns between layers such as API layer 406, services, and applications are in place.

In some embodiments, the system architecture may use a microservice approach. Such systems may use two types of layers: front-end layers and back-end layers, where microservices reside. In this kind of architecture, the role of the API layer 406 may be to provide integration between front-end and back-end layers. In such cases, API layer 406 may use RESTful APIs (exposition to front-end or even communication between microservices). API layer 406 may use the Advanced Message Queuing Protocol (AMQP), which is an open standard for passing business messages between applications or organizations. API layer 406 may use an open-source, high-performance remote procedure call (RPC) framework that may run in a decentralized application environment. In some embodiments, the system architecture may use an open API approach. In such cases, API layer 406 may use commercial or open-source API platforms and their modules. API layer 406 may use a developer portal. API layer 406 may use strong security constraints applying a web application firewall that protects the decentralized applications and/or API layer 406 against common web exploits, bots, and distributed denial-of-service (DDoS) attacks. API layer 406 may use RESTful APIs as standard for external integration.

As shown in FIG. 4, system 400 may use API layer 406 to communicate with and/or facilitate blockchain operations with server 408. For example, server 408 may represent a custodial platform for blockchain operations. A custodial platform may manage private keys stored by a centralized service provider (e.g., server 408). In such cases, server 408 may interact with blockchain 410, a wallet service for blockchain 410, an indexer service for blockchain 410, and/or other platform services.

For example, a wallet service may comprise an application and/or a software-based system that securely stores users' payment information, private keys, and/or passwords facilitating blockchain operations with websites, nodes, and/or other devices. In some embodiments, a wallet service may also provide additional ledger access (e.g., a second ledger). Furthermore, as discussed above, this second ledger may receive updates directly from API layer 406, as opposed to relying on data pulled directly from blockchain 410.

For example, system 400 may maintain its records (e.g., both live and for accounting) in good order separate from balances on blockchain 410. That is, system 400 may maintain an architecture featuring the second ledger, where balances are stored and updated, and the logs of blockchain operations. Conventional systems may rely on directly referencing blockchain 410. However, since the blockchain is the source of truth for the system, such reliance leads to additional technical problems.

First, there is a strong likelihood of impedance mismatch between a format for a platform service and the APIs used to retrieve data from the blockchain (e.g., which may lead to accounting imbalances). For example, system 400 may need to be able to generate accounting entries reflecting changes of balances. However, while changes of balances can be tracked by examining blockchain 410, this requires additional processing and computational power.

Second, accounting changes in a blockchain architecture should be irreversible. This is achieved in practice for current blockchain operations by waiting for a variable number of confirmations from the blockchain (e.g., blockchain 410). By waiting for the variable number of confirmations, the likelihood of an error in the blockchain becomes infinitesimally small. However, while blockchain services rely on this methodology, this is not a rule inherent to the blockchain itself. That is, the blockchain does not have an inherent authentication mechanism that is dependent on a number of confirmations. Instead, the blockchain relies on an absolute system—blockchain operations are either recorded on a particular node or they are not.

As such, forks in the blockchain are always possible. In the case of a fork, system 400 may not follow the "right" fork for an undetermined amount of time. If that happens, and if, for the purpose of a custodial digital wallet, system 400 decides to move from one fork to another, system 400 may have a more straightforward mechanism to maintain an accurate history of a user account's positions if system 400 stores them independently from a given blockchain. Furthermore, in case of forks, system 400 performs some internal remediation on user accounts, which is enabled by system 400 maintaining a layer of insulation from the blockchain for remedial blockchain operations. For example, system 400 may have a separate storage, protected by the second ledger (e.g., a ledger service), for reads, and by a transfer service, for writes, that reflects the state of the blockchain that is relevant for system 400 purposes.

In some embodiments, the system may also use one or more Application Binary Interfaces (ABIs). An ABI is an interface between two program modules, often between operating systems and user programs. ABIs may be specific to a blockchain protocol. For example, an Ethereum Virtual Machine (EVM) is a core component of the Ethereum network, and a smart contract may be a piece of code stored on the Ethereum blockchain, which are executed on EVM. Smart contracts written in high-level languages like Solidity or Vyper may be compiled in EVM executable bytecode by the system. Upon deployment of the smart contract, the bytecode is stored on the blockchain and is associated with an address. To access functions defined in high-level languages, the system translates names and arguments into byte representations for bytecode to work with it. To interpret the bytes sent in response, the system converts back to the tuple (e.g., a finite ordered list of elements) of return values defined in higher-level languages. Languages that compile for the EVM maintain strict conventions about these conversions, but in order to perform them, the system must maintain the precise names and types associated with the operations. The ABI documents these names and types precisely, and in an easily parsable format, making translations between human-intended method calls and smart-contract operations discoverable and reliable.

For example, ABI defines the methods and structures used to interact with the binary contract similar to an API, but on a lower level. The ABI indicates the caller of the function to encode (e.g., ABI encoding) the needed information like function signatures and variable declarations in a format that the EVM can understand to call that function in bytecode. ABI encoding may be automated by the system using compilers or wallets interacting with the blockchain.

Figure 5:
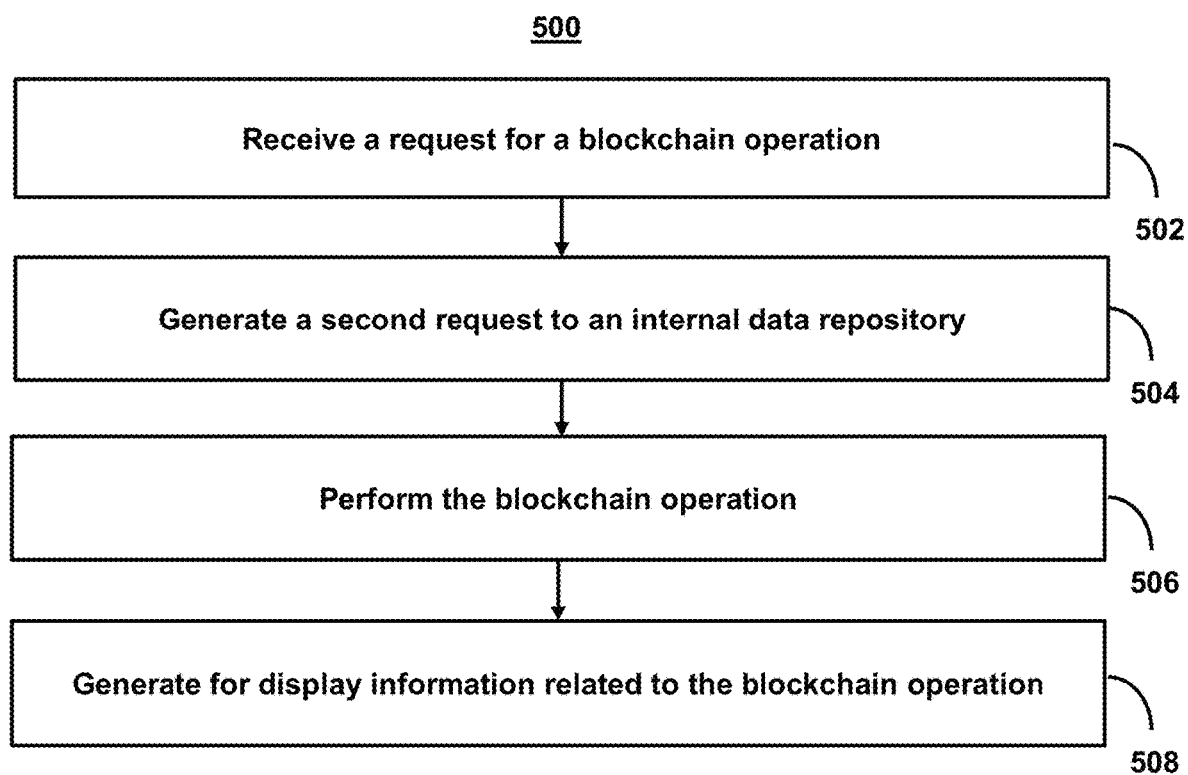
FIG. 5 shows a flowchart of the steps involved in using a blockchain overlay layer, in accordance with one or more embodiments.

FIG. 5 shows a flowchart of the steps involved in using a blockchain overlay layer, in accordance with one or more embodiments. For example, the system (e.g., a blockchain overlay layer) may use process 500 (e.g., as implemented on one or more system components described above) in order to aggregate and access data across blockchain networks using a seamless, single unified programming model in order to perform blockchain operations.

At step 502, process 500 (e.g., using one or more components described above) receives a request for a blockchain operation. For example, the system may receive, at a stateless blockchain overlay layer, a first request for a first blockchain operation, wherein the first request corresponds to a protocol that is native to a first blockchain network, wherein the stateless blockchain overlay layer comprises a plurality of replaceable smart contracts, and wherein the stateless blockchain overlay layer is in communication with a plurality of blockchain nodes for the first blockchain network.

The system may receive a request from one or more devices requesting that the blockchain overlay layer perform an operation. In response to the request, the system may perform one or more operations. For example, the system may generate a response based on a plurality of replaceable smart contracts. In some embodiments, each of the plurality of replaceable smart contracts may comprise a version number, and the stateless blockchain overlay layer may determine which of the plurality of replaceable smart contracts is active based on the version number.

At step 504, process 500 (e.g., using one or more components described above) generates a second request to an internal data repository. For example, the system may, in response to the first request, generate, at the stateless blockchain overlay layer, a second request to an internal data repository for the stateless blockchain overlay layer, wherein the second request corresponds to the protocol that is native to the first blockchain network, and wherein the second request is for data accessible to the internal data repository for the performing the first blockchain operation.

The internal data repository may comprise on-chain or off-chain data storage. Furthermore, the data storage may comprise data specific to a given purpose. For example, in some embodiments, the blockchain overlay layer may be used to bring to blockchain processing and analysis the same speed of development and simplicity that SQL has brought to databases. Instead of building offline indexers, the system may allow users to write smart contracts that the users may deploy, and through which the users can query arbitrary information from the blockchain, with execution taking microseconds. Notably, this provides an easier path to developing external smart contracts, as smart contracts can be first deployed, tested, and used as internal, virtual smart contracts before they are published externally. For example, in one embodiment, the internal data repository may comprise a source code repository. The data may correspond to a known source code contribution, and the first blockchain operation may comprise a submission of a new source code contribution.

In another example, the system may allow on (virtual) chain processing of blockchain events, and may import external, arbitrary data to the virtual layer by means of bridges as well as being blockchain-agnostic. For example, the internal data repository may comprise a configuration file repository, and the data may correspond to a configuration file for converting the protocol that is native to the first blockchain network to a protocol that is native to a second blockchain network. The system may then cause the first blockchain operation to be performed on the second blockchain network. For example, the blockchain overlay layer may convert formats (and rates) between any pair of tokens as an overlay. By doing so, the blockchain overlay layer facilitates functionality such as aggregated balances (e.g., converted to USD) to be computed as a smart contract, which is available at every block height (e.g., replacing the mechanisms for generating portfolio balance history graphs).

In another example, the internal data repository may comprise a configuration file repository, and the data may correspond to a configuration file for converting the protocol that is native to the first blockchain network to a protocol that is not native to the first blockchain network. By doing so, the system may facilitate blockchain operation that comprise an off-chain operation.

For example, the stateless blockchain overlay layer may allow smart contracts to be used as key building blocks for internal and external applications in a computer network. This internal and external application may comprise a wide spectrum of diverse application types and perform functions conventionally handled by indexers, databases, and other types of software applications. That is, the stateless blockchain overlay layer may allow developers to publish their APIs and other software updates. Internal developers may add separate smart contracts with their own state, and deploy them in the blockchain overlay layer (and not externally) while allowing the smart contracts to integrate with an internal software (e.g., GitHub) repository. The developers may then publish an "external" state on the blockchain overlay layer by creating special smart contracts and time-stamping their data.

An example of pseudocode for one blockchain operation (e.g., a ledger balance) is shown in pseudocode 600 of FIG. 6. As shown in pseudocode 600, a "PRAGMA External" annotation allows an interpreter to determine that the data is not stored on the blockchain, but that instead it is stored in a separate datastore and proxied during reads. By doing so, the source of the data is independent of the blockchain, so while the system needs to be able to access it at specific block heights, the data is not attached to a block, but to a time stamp. For example, the system may determine, at the stateless blockchain overlay layer, that the first blockchain operation requires first external data, wherein the first external data corresponds to a first time. The system may then determine a first replaceable smart contract of the plurality of replaceable smart contracts that is time-stamped with the first time. The system may then retrieve the first external data using the first replaceable smart contract, and the system may use the first external data to perform the first blockchain operation.

By doing so, computations that need to join blockchain data with non-blockchain data would import the non-blockchain data onto the blockchain overlay layer, and then merge it with blockchain data in a smart contract, exporting data through public smart contracts on the blockchain overlay layer. The blockchain overlay layer smart contracts may therefore function as an API through which devices on a network communicate. For example, the system may determine that the first blockchain operation requires external data from an external data store. In response to determining that the first blockchain operation requires external data, the system may generate, at the stateless blockchain overlay layer, a new replaceable smart contract, wherein the new replaceable smart contract comprises a time stamp and a pointer to the external data store. In another example, the system may generate, at the stateless blockchain overlay layer, a third request to an external data source for external data. The system may receive, at the stateless blockchain overlay layer, the external data in response to the third request. The system may, in response to receiving the external data, generate, at the stateless blockchain overlay layer, a new replaceable smart contract, wherein the new replaceable smart contract comprises a time stamp and the external data. The system may then publish the new replaceable smart contract to the stateless blockchain overlay layer.

Alternatively or additionally, users may publish their data as a private or semi-private layer 2 using an external event as shown by pseudocode 700 of FIG. 7. For example, in some embodiments, the system may also retrieve data directly from a block. For example, the system may determine, at the stateless blockchain overlay layer, that the first blockchain operation corresponds to a first state of the first blockchain network. The system may then determine a first block of the first blockchain network corresponding to the first state. The system may then retrieve raw blockchain data from the first block, and use the raw blockchain data to perform the first blockchain operation.

At step 506, process 500 (e.g., using one or more components described above) performs the blockchain operation. For example, in response to the second request, the system may perform, by the stateless blockchain overlay layer, the first blockchain operation. In some embodiments, the system may perform additional blockchain operations (e.g., based on one or more triggering events). For example, the system may tail certain event types. While there is no native way to do this in Solidity or Ethereum, the system may do this by defining a new PRAGMA to perform this as shown by pseudocode 800 of FIG. 8. For example, pseudocode 800 of FIG. 8 allows the blockchain overlay layer to trigger a specific observer that is to be called on every transfer event generated by a smart contract of this type (e.g., USD Coin) if the signature of the function matches the parameters of the event.

At step 508, process 500 (e.g., using one or more components described above) generates for display information related to the blockchain operation. For example, the system may, in response to performing the first blockchain operation, generate for display, on a user interface, information confirming the first blockchain operation was performed. For example, the system may generate content about a smart contract, a blockchain network, a blockchain operation, and/or a blockchain overlay layer. For example, the blockchain overlay layer may perform remote procedure calls on a given blockchain as shown in pseudocode 900 of FIG. 9. For example, as shown in FIG. 9, the blockchain overlay layer may allow smart contracts to automatically generate remote procedure call endpoints from registered smart contract functions and services.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, at a stateless blockchain overlay layer, a first request for a first blockchain operation, wherein the first request corresponds to a protocol that is native to a first blockchain network, wherein the stateless blockchain overlay layer comprises a plurality of replaceable smart contracts, and wherein the stateless blockchain overlay layer is in communication with a plurality of blockchain nodes for the first blockchain network; in response to the first request, generating, at the stateless blockchain overlay layer, a second request to an internal data repository for the stateless blockchain overlay layer, wherein the second request corresponds to the protocol that is native to the first blockchain network, and wherein the second request is for data accessible to the internal data repository for the performing the first blockchain operation; in response to the second request, performing, by the stateless blockchain layer, the first blockchain operation; and in response to performing the first blockchain operation, generating for display, on a user interface, information confirming the first blockchain operation was performed.
2. The method of any one of the preceding embodiments, wherein the method is for aggregating and accessing data across blockchain networks using a seamless, single unified programming model in order to perform blockchain operations.
3. The method of any one of the preceding embodiments, further comprising: determining, at the stateless blockchain overlay layer, that the first blockchain operation corresponds to a first state of the first blockchain network; determining a first block of the first blockchain network corresponding to the first state; retrieving raw blockchain data from the first block; and using the raw blockchain data to perform the first blockchain operation.
4. The method of any one of the preceding embodiments, further comprising: determining, at the stateless blockchain overlay layer, that the first blockchain operation requires first external data, wherein the first external data corresponds to a first time; determining a first replaceable smart contract of the plurality of replaceable smart contracts that is time-stamped with the first time; retrieving the first external data using the first replaceable smart contract; and using the first external data to perform the first blockchain operation.
5. The method of any one of the preceding embodiments, wherein the internal data repository comprises a source code repository, wherein the data corresponds to a known source code contribution, and wherein the first blockchain operation comprises a submission of a new source code contribution.
6. The method of any one of the preceding embodiments, wherein the internal data repository comprises a configuration file repository, wherein the data corresponds to a configuration file for converting the protocol that is native to the first blockchain network to a protocol that is native to a second blockchain network, and wherein the first blockchain operation is performed on the second blockchain network.
7. The method of any one of the preceding embodiments, wherein the internal data repository comprises a configuration file repository, wherein the data corresponds to a configuration file for converting the protocol that is native to the first blockchain network to a protocol that is not native to the first blockchain network, and wherein the first blockchain operation comprises an off-chain operation.
8. The method of any one of the preceding embodiments, wherein the internal data repository comprises a function call repository, wherein the data corresponds to a function call for a specific event type, and wherein the first blockchain operation comprises creating a new replaceable smart contract that performs the function call in response to detecting the specific event type.
9. The method of any one of the preceding embodiments, further comprising: determining that the first blockchain operation requires external data from an external data store; and in response to determining that the first blockchain operation requires external data, generating, at the stateless blockchain overlay layer, a new replaceable smart contract, wherein the new replaceable smart contract comprises a time stamp and a pointer to the external data store.
10. The method of any one of the preceding embodiments, further comprising: generating, at the stateless blockchain overlay layer, a third request to an external data source for external data; receiving, at the stateless blockchain overlay layer, the external data in response to the third request; in response to receiving the external data, generating, at the stateless blockchain overlay layer, a new replaceable smart contract, wherein the new replaceable smart contract comprises a time stamp and the external data; and publishing the new replaceable smart contract to the stateless blockchain overlay layer.

11. The method of any one of the preceding embodiments, wherein each of the plurality of replaceable smart contracts comprises a version number, and wherein the stateless blockchain overlay layer determines which of the plurality of replaceable smart contracts is active based on the version number.

12. A tangible, non-transitory, machine-readable medium storing instructions that, when executed by a data processing apparatus, cause the data processing apparatus to perform operations comprising those of any of embodiments 1-11.

13. A system comprising one or more processors; and memory storing instructions that, when executed by the processors, cause the processors to effectuate operations comprising those of any of embodiments 1-11.

14. A system comprising means for performing any of embodiments 1-11.

What is claimed is:

1. A system for aggregating and accessing data across blockchain networks using a seamless, single unified programming model in order to perform blockchain operations, the system comprising:

one or more cryptography-based storage applications, wherein the one or more cryptography-based storage applications correspond to respective private keys, and wherein the respective private keys are stored on respective user devices;

one or more blockchain nodes of a first blockchain network, wherein the one or more blockchain nodes comprises one or more processors configured to verify batches of blockchain operations, and wherein each batch of the batches comprises a plurality of blockchain operations involving the one or more cryptography-based storage applications;

a stateless blockchain overlay layer distributed across the one or more blockchain nodes and accessible to the one or more cryptography-based storage applications, wherein the stateless blockchain overlay layer comprises a plurality of replaceable smart contracts, wherein each of the plurality of replaceable smart contracts comprises a version number, and wherein the stateless blockchain overlay layer determines which of the plurality of replaceable smart contracts is active based on the version number; and wherein the stateless blockchain overlay layer is configured to, via the one or more processors of the one or more blockchain nodes:

receive a first request for a first blockchain operation, wherein the first request corresponds to a protocol that is native to the first blockchain network;

generate a second request to an internal data repository for the stateless blockchain overlay layer in response to the first request, wherein the second request corresponds to the protocol that is native to the first blockchain network, and wherein the second request is for data accessible to the internal data repository for performing the first blockchain operation;

perform the first blockchain operation in response to the second request; and generate for display, on a user interface, information confirming the first blockchain operation was performed in response to performing the first blockchain operation.

2. A method for aggregating and accessing data across blockchain networks using a seamless, single unified programming model in order to perform blockchain operations, the method comprising:

receiving, at a stateless blockchain overlay layer, a first request for a first blockchain operation, wherein the first request corresponds to a protocol that is native to a first blockchain network, wherein the stateless blockchain overlay layer comprises a plurality of replaceable smart contracts, and wherein the stateless blockchain overlay layer is in communication with a plurality of blockchain nodes for the first blockchain network;

in response to the first request, generating, at the stateless blockchain overlay layer, a second request to an internal data repository for the stateless blockchain overlay layer, wherein the second request corresponds to the protocol that is native to the first blockchain network, and wherein the second request is for data accessible to the internal data repository for performing the first blockchain operation;

in response to the second request, performing, by the stateless blockchain overlay layer, the first blockchain operation, wherein performing the first blockchain operation comprises:

determining, at the stateless blockchain overlay layer, that the first blockchain operation requires first external data, wherein the first external data corresponds to a first time;

determining a first replaceable smart contract of the plurality of replaceable smart contracts that is time-stamped with the first time;

retrieving the first external data using the first replaceable smart contract; and using the first external data to perform the first blockchain operation; and in response to performing the first blockchain operation, generating for display, on a user interface, information confirming the first blockchain operation was performed.

3. The method of claim 2, further comprising:

determining, at the stateless blockchain overlay layer, that the first blockchain operation corresponds to a first state of the first blockchain network;

determining a first block of the first blockchain network corresponding to the first state;

retrieving raw blockchain data from the first block; and using the raw blockchain data to perform the first blockchain operation.

4. The method of claim 2, wherein the internal data repository comprises a source code repository, wherein the data corresponds to a known source code contribution, and wherein the first blockchain operation comprises a submission of a new source code contribution.

5. The method of claim 2, wherein the internal data repository comprises a configuration file repository, wherein the data corresponds to a configuration file for converting the protocol that is native to the first blockchain network to a protocol that is native to a second blockchain network, and wherein the first blockchain operation is performed on the second blockchain network.

6. The method of claim 2, wherein the internal data repository comprises a configuration file repository, wherein the data corresponds to a configuration file for converting the protocol that is native to the first blockchain network to a protocol that is not native to the first blockchain network, and wherein the first blockchain operation comprises an off-chain operation.

7. The method of claim 2, wherein the internal data repository comprises a function call repository, wherein the data corresponds to a function call for a specific event type, and wherein the first blockchain operation comprises creating a new replaceable smart contract that performs the function call in response to detecting the specific event type.

8. The method of claim 2, further comprising:
determining that the first blockchain operation requires external data from an external data store; and
in response to determining that the first blockchain operation requires external data, generating, at the stateless blockchain overlay layer, a new replaceable smart contract, wherein the new replaceable smart contract comprises a time stamp and a pointer to the external data store.

9. The method of claim 2, further comprising:
generating, at the stateless blockchain overlay layer, a third request to an external data source for external data;
receiving, at the stateless blockchain overlay layer, the external data in response to the third request;
in response to receiving the external data, generating, at the stateless blockchain overlay layer, a new replaceable smart contract, wherein the new replaceable smart contract comprises a time stamp and the external data; and
publishing the new replaceable smart contract to the stateless blockchain overlay layer.

10. The method of claim 2, wherein each of the plurality of replaceable smart contracts comprises a version number, and wherein the stateless blockchain overlay layer determines which of the plurality of replaceable smart contracts is active based on the version number.

11. The system of claim 1, wherein performing the first blockchain operation comprises:
determine, at the stateless blockchain overlay layer, that the first blockchain operation requires first external data, wherein the first external data corresponds to a first time;
determine a first replaceable smart contract of the plurality of replaceable smart contracts that is time-stamped with the first time;
retrieve the first external data using the first replaceable smart contract; and
use the first external data to perform the first blockchain operation.

12. The system of claim 1, wherein the stateless blockchain overlay layer is further configured to:
generate, at the stateless blockchain overlay layer, a third request to an external data source for external data;
receive, at the stateless blockchain overlay layer, the external data in response to the third request;
in response to receiving the external data, generate, at the stateless blockchain overlay layer, a new replaceable smart contract, wherein the new replaceable smart contract comprises a time stamp and the external data; and
publish the new replaceable smart contract to the stateless blockchain overlay layer.

13. One or more non-transitory, computer-readable media, comprising instructions that, when executed by one or more processors, cause operations comprising:
receiving, at a stateless blockchain overlay layer, a first request for a first blockchain operation, wherein the first request corresponds to a protocol that is native to a first blockchain network, wherein the stateless blockchain overlay layer comprises a plurality of replaceable smart contracts, and wherein the stateless blockchain overlay layer is in communication with a plurality of blockchain nodes for the first blockchain network;
in response to the first request, generating, at the stateless blockchain overlay layer, a second request to an internal data repository for the stateless blockchain overlay layer, wherein the second request corresponds to the protocol that is native to the first blockchain network, and wherein the second request is for data accessible to the internal data repository for performing the first blockchain operation;
in response to the second request, performing, by the stateless blockchain overlay layer, the first blockchain operation;
in response to performing the first blockchain operation, generating for display, on a user interface, information confirming the first blockchain operation was performed;
generating, at the stateless blockchain overlay layer, a third request to an external data source for external data;
receiving, at the stateless blockchain overlay layer, the external data in response to the third request;
in response to receiving the external data, generating, at the stateless blockchain overlay layer, a new replaceable smart contract, wherein the new replaceable smart contract comprises a time stamp and the external data; and
publishing the new replaceable smart contract to the stateless blockchain overlay layer.

14. The one or more non-transitory, computer-readable media of claim 13, the operations further comprising:
determining, at the stateless blockchain overlay layer, that the first blockchain operation corresponds to a first state of the first blockchain network;
determining a first block of the first blockchain network corresponding to the first state;
retrieving raw blockchain data from the first block; and
using the raw blockchain data to perform the first blockchain operation.

15. The one or more non-transitory, computer-readable media of claim 13, wherein performing the first blockchain operation comprises:
determining, at the stateless blockchain overlay layer, that the first blockchain operation requires first external data, wherein the first external data corresponds to a first time;
determining a first replaceable smart contract of the plurality of replaceable smart contracts that is time-stamped with the first time;
retrieving the first external data using the first replaceable smart contract; and
using the first external data to perform the first blockchain operation.

16. The one or more non-transitory, computer-readable media of claim 13, wherein the internal data repository comprises a source code repository, wherein the data corresponds to a known source code contribution, and wherein the first blockchain operation comprises a submission of a new source code contribution.

17. The one or more non-transitory, computer-readable media of claim 13, wherein the internal data repository comprises a configuration file repository, wherein the data corresponds to a configuration file for converting the protocol that is native to the first blockchain network to a protocol that is native to a second blockchain network, and wherein the first blockchain operation is performed on the second blockchain network.

18. The one or more non-transitory, computer-readable media of claim 13, wherein the internal data repository comprises a configuration file repository, wherein the data corresponds to a configuration file for converting the protocol that is native to the first blockchain network to a protocol that is not native to the first blockchain network, and wherein the first blockchain operation comprises an off-chain operation.

19. The one or more non-transitory, computer-readable media of claim 13, wherein the internal data repository comprises a function call repository, wherein the data corresponds to a function call for a specific event type, and wherein the first blockchain operation comprises creating at least one new replaceable smart contract that performs the function call in response to detecting the specific event type.

20. The one or more non-transitory, computer-readable media of claim 13, the operations further comprising:
   determining that the first blockchain operation requires at least some external data from an external data store; and
   in response to determining that the first blockchain operation requires at least some external data, generating, at the stateless blockchain overlay layer, at least one new replaceable smart contract, wherein the at least one new replaceable smart contract comprises a time stamp and a pointer to the external data store.

* * * * *